Sept. 30, 1969     R. G. RUSSELL ET AL     3,469,796
METHOD AND APPARATUS FOR HANDLING STRAND
Filed Oct. 23, 1965     5 Sheets-Sheet 1
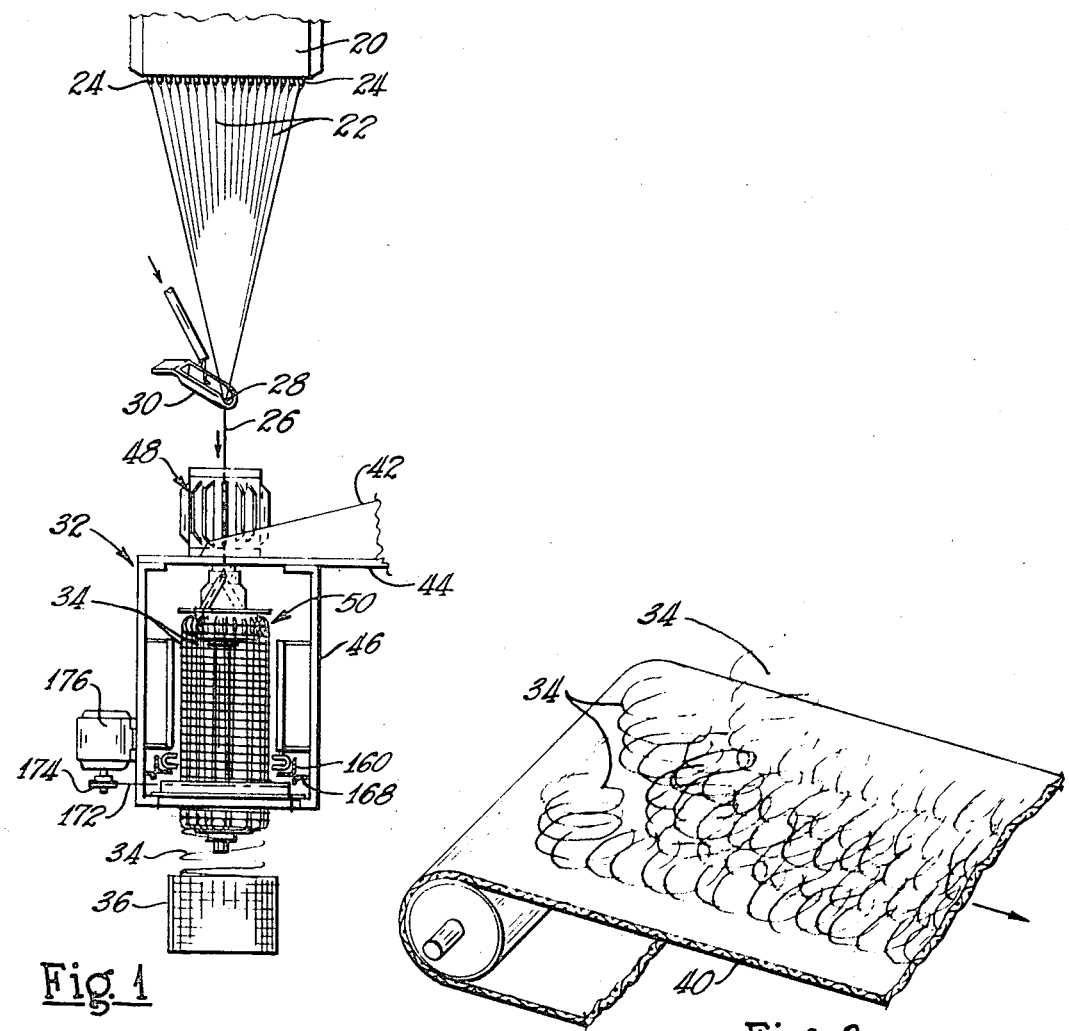
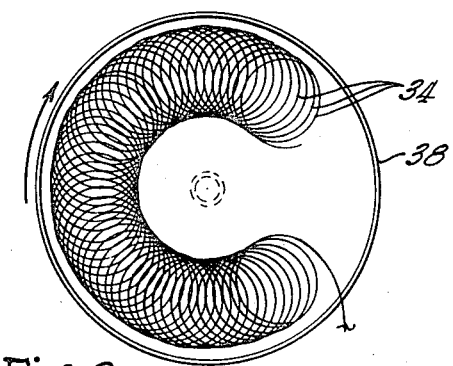
INVENTORS
ROBERT G. RUSSELL &
CECIL R. CUNNINGHAM
BY
Staelin & Overman
ATTORNEYS

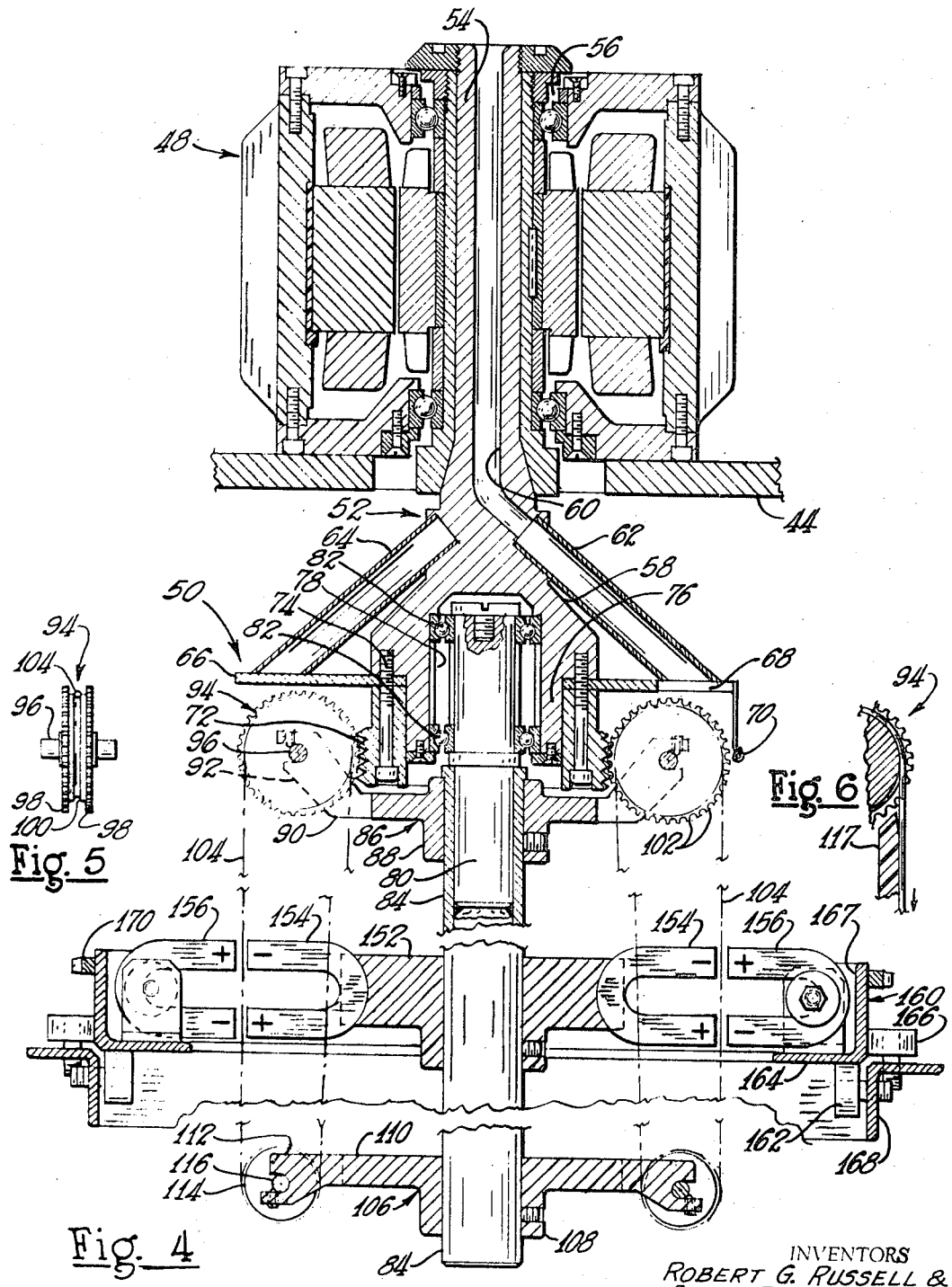

Sept. 30, 1969     R. G. RUSSELL ET AL     3,469,796
METHOD AND APPARATUS FOR HANDLING STRAND
Filed Oct. 23, 1965                         5 Sheets-Sheet 3

INVENTORS
ROBERT G. RUSSELL &
CECIL R. CUNNINGHAM
BY
Staelin + Overman
ATTORNEYS United States Patent Office 3,469,796
Patented Sept. 30, 1969

3,469,796
METHOD AND APPARATUS FOR
HANDLING STRAND
Robert G. Russell, Granville, Ohio, and Cecil R. Cunningham, Aiken, S.C., assignors to Owens-Corning Fiberglas Corporation, a corporation of Delaware
Filed Oct. 23, 1965, Ser. No. 503,865
Int. Cl. B65h 51/20, 55/00
U.S. Cl. 242—47.13                 8 Claims

ABSTRACT OF THE DISCLOSURE

Apparatus is provided for forming a strand or the like into loops and for conveying the loops in a closely-spaced, orderly manner. The strand is received in a rotating tube which throws it into spiral loops which are collected and carried away on the periphery of a plurality of parallel conveyors arranged in a cylindrical disposition. The conveyors are suspended below the loop-forming means in a manner such that relative rotation between the conveyors and the loop-forming means can be carefully controlled. This can be accomplished through a magnetic arrangement in which the magnets can be moved in a circular path or can be accomplished through a motor arranged coaxially with a main drive motor.

---

This invention relates to a method and apparatus for handling and collecting strand and more specifically for transforming a lineally-moving strand into a spiral of closely spaced loops.

Particularly in the glass fiber art, when glass filaments are produced and packaged, they usually are gathered into a strand and wound on a drum, subsequently being unwound and further processed for specific uses. While this technique is widespread, it has certain disadvantages. When the strand is wound on the drum, it is necessarily placed in tension with the result that the strand in the inner layers is under sufficient pressure that the filaments tend to cohere. This type of packaging also aggravates a tendency for the filaments to abrade and sever when wound on the drum. The package of strand made by this technique also is limited in the maximum size that can be produced, from a practical standpoint. In addition, when the strand is unwound from the package for further processing, the free end is often difficult to find, considerable time being consumed in the overall process to accomplish this.

Certain attempts have been made heretofore to collect the filaments or strand on a surface or in a container with the strand being disposed in a predetermined pattern prior to being deposited. This technique also has resulted in difficulties. The strand has been incapable of being deposited in sufficiently-definite patterns so as to lie on the surface or in the container in the desired manner, with the result that when the strand is subsequently removed for further processing, frequent tangles result. Second, a size or binder is applied to the strand prior to its being deposited, with the coating not being completely dry by the time the strand reaches the surface. Consequently, the strand, after drying, has a tendency to stick together, thereby again causing entanglements.

Still other techniques have been devised for maintaining the strand from overlapping and coming into contact with itself prior to the drying of the coating. Various other difficulties have arisen from these attempts, however.

The present invention relates to a method and apparatus for forming strand into a spiral and for collecting the loops of strand without any of the difficulties heretofore incurred.

The term "strand" is used in a broad sense throughout most of the specification and in all of the claims to refer generically to products which may comprise both continuous and staple strands as well as a plurality of filaments, monofilaments, fibers, yarns, tow, sliver, staple yarn, thread, ribbon, and rope.

It is, therefore, a principal object of the invention to provide a method and apparatus for handling a strand and to transform it from a lineal to a looping configuration which is readily handleable, easy to transport, and can be unwound without entangling.

Another object of the invention is to provide apparatus for depositing strand in the form of overlapping loops on a surface with the strand held apart for a sufficient time for coating thereon to dry prior to deposition.

Still another object of the invention is to provide a method and apparatus for depositing a strand on a surface in a more fully controlled pattern than heretofore possible.

Numerous other objects and advantages of the invention will be apparent from the following detailed description of preferred embodiments thereof, reference being made to the accompanying drawing, in which:

FIG. 1 is a view in elevation of apparatus for forming a lineally moving strand, shaping the strand into a spiral of closely spaced loops, and depositing the loops in a container;

FIG. 2 is a plan view of a larger diameter container in which the loops are deposited in a circular path as the container is slowly rotated;

FIG. 3 is a fragmentary view of a conveyor onto which strand loops from several of the apparatuses shown in FIG. 1 are deposited in slightly overlapping relation to form a uniform mat of strand;

FIG. 4 is an enlarged, fragmentary view in vertical cross section of loop-forming apparatus shown in FIG. 1;

FIG. 5 is an edge view of a sprocket wheel of the loop-forming apparatus of FIG. 4;

FIG. 6 is a fragmentary view in cross section of a sprocket wheel of FIGS. 4 and 5 and showing a support backing up a resilient band constituting a conveyor used with the sprocket;

Figure 7:
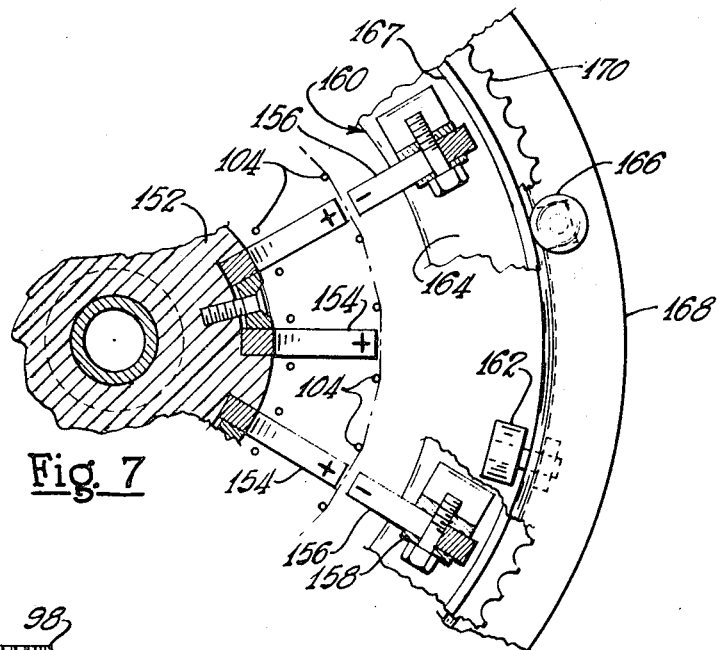
FIG. 7 is a fragmentary view in horizontal cross section, with parts broken away, taken along the line 7—7 of FIG. 4.

Referring to FIG. 1, apparatus is shown for producing filaments, gathering them into a strand, forming the strand into a spiral of closely spaced loops, and depositing the loops on a surface. A bushing 20 embodying the invention is of a conventional design and will be discussed only briefly. The bushing is electrically heated and melts glass marbles, cullet, or batch supplied thereto with filaments 22 then being drawn or attenuated from bushing tips 24. The filaments 22 are gathered into a strand 26 by means of a gathering shoe 28 with a size or binder being applied to the strand at this point by a coating applicator 30. The strand 26 is a strand in the technical sense used in the glass fiber art, but in subsequent usage and in the claims, the term strand is used in the broad sense defined previously.

Loop-forming apparatus indicated at 32 transforms the lineally moving strand 26 into a spiral of closely-spaced, horizontally-disposed loops 34. The loops are subsequently deposited in a container 36 which can have a diameter slightly larger than the loops so that the loops are built up in a generally cylindrical package. The loops are held in spaced relationship as they move down the loop-forming apparatus 32 and are spaced apart from the time the coating is applied at the gathering shoe 28 until the loops are deposited in the container 36. Consequently, the coating applied to the strand is dried before reaching the container with the result that the strand will not tend to stick together and tangle as has often been the case heretofore. Also, there is no tension on the strand as it is deposited in the container 36.

Instead of the container 36, a large container 38 can be used, as shown in FIG. 2. This container is over twice the diameter of the loops 34 and is rotated as the loops are deposited whereby the loops lay in a circular path therein. Packages of strand of almost any size can be made in this manner. Rather than actually packaging the strand, it can be made into a mat of uniform and controlled pattern by using several of the strand-forming and loop-forming apparatuses as shown in FIG. 1. These are located across a conveyor belt 40 with the strand loops 34 deposited in overlapping relationship, as shown, to form a mat which can be further processed, as by being coated with a binder or other material to produce an integral product. Since the size and position of the loops can be very closely controlled, the resulting mat is extremely uniform and does not have areas of varying density as has often been the case heretofore.

Referring specifically to the loop-forming apparatus 32, a bracket 42 is suitably supported below the bushing 20 at one side thereof and has a main supporting frame 44 with a depending supporting frame 46. A drive motor 48 is mounted on the frame 44 and a forming and conveying assembly 50 is suspended therebelow and driven by the motor 48. The loops formed on the assembly 50 can be of large diameter and have little, if any, tendency to twist or tangle. Further, the coating has sufficient time to dry as the loops move at a controlled rate down the assembly.

As shown in FIG. 4, the assembly has a supporting and driving member 52 including a motor shaft 54 held by an upper bearing 56, and an enlarged, lower connecting portion 58. The shaft 54 has a vertical strand passage 60 therein which turns outwardly at the bottom and communicates with a guide tube 62 held by the lower portion 58 for directing the strand downwardly and outwardly. A second tube 64 is a dummy and is employed only for purposes of balancing the member 52. The tubes 62 and 64 terminate at a supporting skirt 66 having an opening 68 through which the strand can pass. The strand is threaded through a guide eye 70 which rotates with the skirt 66 and the member 52 to cause the strand to be deposited in a circular path to form a loop of the spiral.

A large worm gear 72 is axially aligned with the shaft 54 and is affixed to the lower portion 58 of the member 52 by suitable fasteners or machine screws 74 which also attach the skirt 66 thereto. A cylindrical extension 76 helps locate the worm gear 72 and also forms a central bearing recess 78 in which a depending supporting shaft 80 is rotatably held by bearings 82. In this manner, the shaft 80 can rotate independently of the supporting member 52.

A sleeve 84 is fastened to part of the supporting shaft 80 and has an upper spider 86 suitably affixed thereto with the spider including a hub 88 and a plurality of radially-extending arms 90 with upwardly turned yokes 92. A sprocket wheel 94 (see also FIG. 5) is rotatably carried by each pair of the yokes 92 through a shaft 96. The sprocket wheel 94 includes a pair of spaced sprockets 98 and an intermediate pulley 100. The sprockets 98 actually function as worm wheels, engaging the worm 72 and rotating on the axles 96 as relative rotation about a vertical axis is established between the worm 72 and the sprockets 98. The spider 86 and the sprockets 98 are held relatively stationary, as will be discussed subsequently, relative to the speed of rotation of the member 52. In this manner, the worm 72 drives the sprockets 98 during rotation, the left hand sprocket in FIG. 4 rotating in a counterclockwise direction and the right hand sprocket in this figure rotating in a clockwise direction.

The guide eye 70 rotates with the worm 72 and deposits the strand between teeth 102 of the sprockets 98 during rotation. The teeth of the worm and worm wheel are designed such that the sprockets present the next tooth space to the guide 70 upon the next revolution of the guide. Hence, for each rotation of the guide 70, a loop of the strand is deposited in the next series of spaces between the teeth 102 of the sprockets. In addition, the guide 70 is preferably located so as to deposit the strand in a space just above a horizontal line through the axles 96 of the sprockets so that the strand will tend to be stretched slightly as it rotates to the full diameter of the sprockets and is carried downwardly. This relieves excess tension in the strand. In addition to receiving and spacing the strand loops, the wheels 94 have a second function in driving the pulleys 100 and causing conveyor belts 104, shown specifically as resilient bands or long O-rings, to move with their outer legs or runs travelling downwardly and carrying the spaced loops downwardly, maintaining the spacing while doing so.

A second support or spider 106 is affixed to a lower portion of the sleeve 84 at any suitable distance from the upper spider 86. The distance between the spiders should be sufficient to assure drying of the binder or size on the strand before the loops are dropped off the lower end of the belts 104. The spider 106 includes a hub 108 and arms 110 terminating in yokes 112. Idler pulleys 114 have axles 116 rotatably carried by the yokes. The pulleys 114 are positioned so that the outer runs of the belts 104 are generally parallel in order to maintain the strand thereon. However, it is not essential and may not even be desirable that the pulleys 114 be located in precise vertical alignment with the associated sprocket wheels 94. Rather, they can be spaced slightly to one side thereof so that the adjacent outer runs of the adjacent belts, while lying substantially in a vertical plane, are not quite parallel. In this manner, as the strand loops move downwardly on the belts, the belts continually engage slightly different points on the strand loops so that there is no tendency for the strand loops to stick to the belts as the binder dries during downward movement.

The strand deposited on the sprockets 98 is under considerable tension due to the force required to attenuate the filaments from the bushing tips. While this tension is relieved somewhat as the strand tends to be expanded during its movement past the largest diameter of the wheels 98, the strand will still be under some tension during downward movement on the belts 104, this tension being necessary, of course, to prevent the strand loops from slipping off the belt. Because of the tension, it may be necessary in some instances to back up or support the intermediate portions of the belts 104. For this purpose, a plastic bar 117, shown in FIG. 6, can be used immediately behind each of the belts 104, with the plastic bars being suitably mounted on the central sleeve 84.

Figure 8:
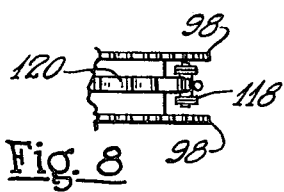
FIG. 8 is a fragmentary plan view of a modified sprocket arrangement for a conveyor of the apparatus of FIG. 4.
Figure 9:
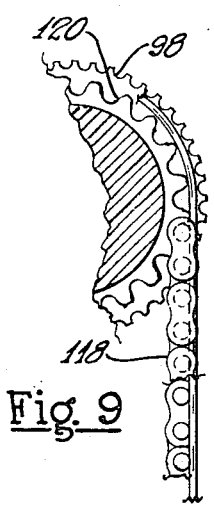
FIG. 9 is a view in vertical cross section of the sprocket and conveyor arangement of FIG. 8.

As another means of backing up the belt 104, a chain 118 can be used therewith as shown in FIGS. 8 and 9. In this instance, the pulley 100 between the sprockets 98 is replaced by a central sprocket 120.

Figure 10:
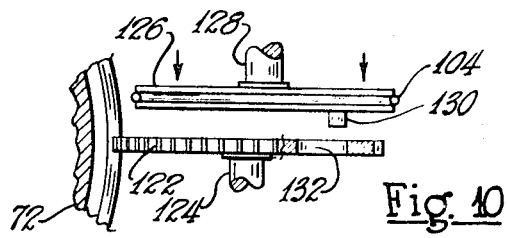
FIG. 10 is a fragmentary plan view, with components spaced apart, of a modified drive arrangement for a resilient band type of conveyor.
Figure 11:
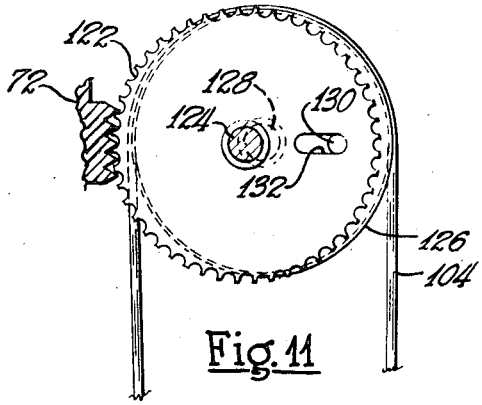
FIG. 11 is a view in elevation of the apparatus shown in FIG. 10.

Rather than depositing the strand on the sprockets or worm wheels 98, it may be desirable to deposit it directly on the conveyor belts 104 to eliminate the transfer from the sprockets to the belts and possible snagging of the strand during the transfer. For this purpose, the drive arrangement shown in FIGS. 10 and 11 can be used. Accordingly, a single sprocket or worm wheel 122 can be rotatably mounted by a stub shaft 124 in one leg 92 of the yoke 90. A pulley 126 is similarly mounted by a stub shaft 128 in the other leg of the yoke, but with the shafts being axially offset, the shaft 128 being mounted outwardly of the shaft 124. The pulley 126 has an engaging pin 130 which extends into a slot 132 of the sprocket 122 so that rotation of the sprocket 122 by the worm 72 causes rotation of the pulley 126, yet enables the pulley perimeter and the belt 104 to be located beyond the sprocket 122, whereby the guide 70 can deposit the strand directly on the belt.

Figure 12:
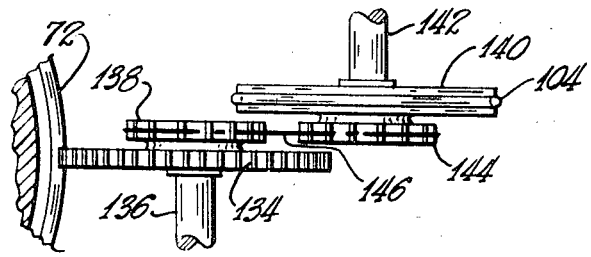
FIG. 12 is a view similar to FIG. 10 of a modified driving arrangement for a conveyor.
Figure 13:
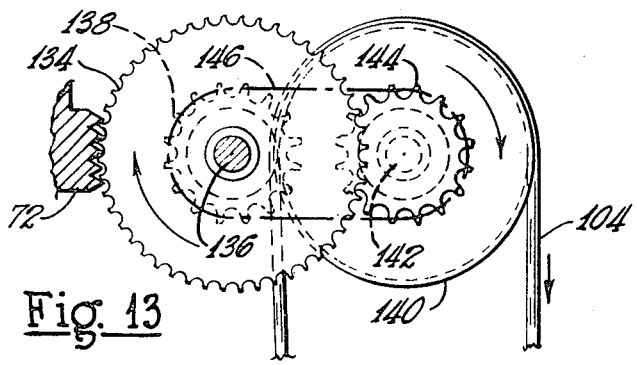
FIG. 13 is a view in elevation of the apparatus of FIG. 12.

Another drive arrangement, particularly suitable for loop-forming apparatuses wherein the loops are of larger diameter, is shown in FIGS. 12 and 13. Here, a sprocket 134 has a stub shaft 136 rotatably mounted in a suitable supporting yoke (not shown) and has a drive sprocket 138 on the opposite side. A drive pulley 140 for the belt 104 has a stub shaft 142 with a sprocket 144 on the opposite side. The two sprockets 138 and 144 are aligned and are connected by a chain 146 so that the strand again can be deposited directly on the belt.

Figure 14:
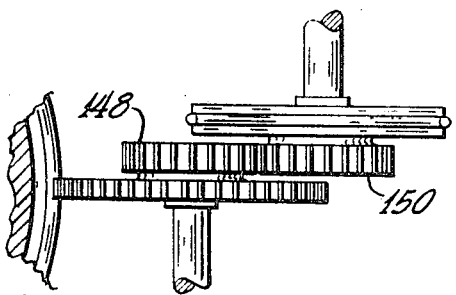
FIG. 14 is a view in elevation similar to FIG. 10 or 12 of still further modified conveyor driving apparatus.
Figure 15:
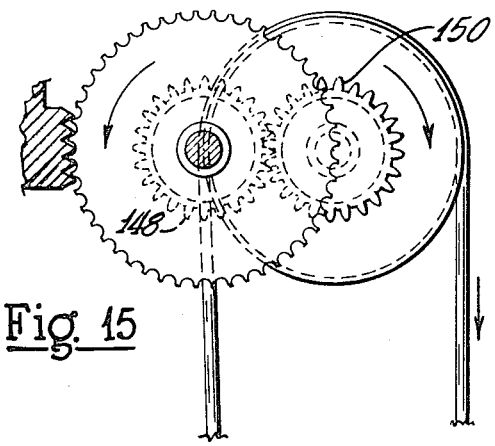
FIG. 15 is a view in elevation of the apparatus of FIG. 14.

In FIGS. 14 and 15, another modified arrangement is shown, with the sprockets 138 and 144 being replaced by spur gears 148 and 150. Since the drive is in the opposite direction in this instance, the lead angle of the worm gear must be changed, unless the loop forming and conveying unit is driven in the opposite direction.

With the supporting member 52 driven at relatively high speed by the motor 48, there will be, of course, a strong tendency for the lower conveying assembly and the shafa 80 to rotate in a similar manner, in the absence of the friction of the bearings 82 being zero. The lower unit cannot be easily prevented from rotating because of the continuously downwardly moving loops 34 which would tend to be impeded by most devices which might ordinarily be employed. It has been discovered, however, that magnets can be employed to achieve this purpose. Accordingly, referring to FIGS. 4 and 7, an intermediate hub 152 is affixed to an intermediate portion of the sleeve 84 and has a plurality of magnets 154 affixed thereto and extending radially outwardly in vertical planes. As shown in FIG. 7, the magnets are located between the conveyor belts 104 and, in this instance, there are two of the belts 104 between each adjacent pair of magnets. For each of the radially outwardly extending magnets 154, there is a radially inwardly extending magnet 156 aligned therewith, with the poles being opposite.

In accordance with the invention, the magnets 156 are mounted by brackets 158 on a supporting ring 160 which is rotatably supported by vertical rollers 162 engaging a horizontal leg 164 of the support and by horizontal rollers 166 engaging a vertical leg 167 of the support. The rollers 162 and 166 are carried by an annular bracket 168 which is, in turn, supported by the depending frame 46 (FIG. 1). A ring gear or sprocket 170 is mounted on the vertical leg 167 of the ring 160 and can be rotated through a chain 172 and a pinion 174 by a motor 176 mounted on the frame 46.

With this arrangement, the conveying unit mounted on the shaft 80 can be rotated in either a clockwise or a counterclockwise direction around a vertical axis entirely independently of the rotation of the supporting member 52. The lower assembly can also be held stationary but it has been found to be advantageous to rotate this unit because a better control over the deposition of the loops 34 is provided as the loops fall off the lower ends of the conveyors onto the collecting surface. With rotation of perhaps 200 r.p.m., by way of example, for the lower conveying unit, the loops retain their concentricity more effectively during the free fall. The tension on the strand deposited on the sprocket wheels 94 also can be controlled to some extent by the rotation of the lower unit. Of course, any rotation of the lower unit is very slow compared to that of the supporting member 52.

Figure 16:
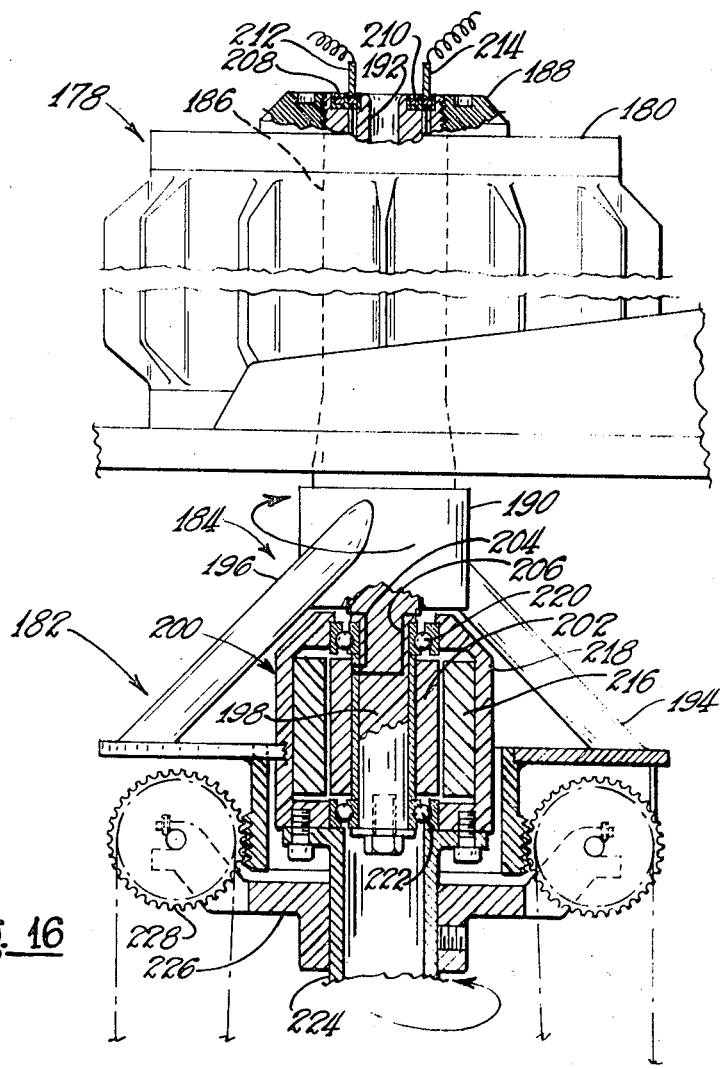
FIG. 16 is a fragmentary view in elevation with parts broken away and with parts in section of modified loop-forming apparatus.

Referring to FIG. 16, a modified coil forming apparatus is shown with a different means of controlling rotation of the lower conveying unit relative to the supporting member. Basically, in this embodiment, a motor which is driven in a direction opposite to the main drive motor is substituted for the magnets 154 and 156 and their supporting assemblies. Accordingly, a modified winding apparatus is designated 178 and includes a drive motor 180 to drive a lower assembly 182 and specifically a supporting member 184. The member 184 includes a drive shaft 186 supported by a bearing assembly 188 at the upper end of the motor 180, and a lower enlarged portion 180. The drive shaft 186 again has a passage 192 therein for the strand and has a pair of guiding tubes 194 and 196, one of which is a dummy for balancing purposes. Rather than having a bearing recess, the portion 190 has a depending supporting shaft 198 rotatable therewith which constitutes a drive shaft for a counter motor 200. The motor 200 has an armature 202 to which power is supplied through lines 204 and 206. These lines extend upwardly through the shaft 186 and terminate in slip rings 208 and 210 which are in electrical contact with wiper terminals 212 and 214. These are suitably connected to a source of power to complete a circuit through the rings 208 and 210 and the lines 204 and 206 to the armature 202. A suitable field is established around the armature. In the form shown, magnets 216 provide a D.C. field, the magnets being supported by a housing 218. The housing 218 is rotatably mounted on the shaft 198 by upper and lower bearings 220 and 222. A lower supporting shaft 224, corresponding to the sleeve 84, is affixed to the housing and depends therebelow to support a spider 226 and sprocket wheels 228 corresponding to the spider 86 and the sprocket wheels 94. An idler spider and idler wheels also can be used corresponding to the spider 106 and the wheels 114 although, in this case, the magnets 154 and 156 are completely eliminated.

As indicated, the motor 200 rotates in a direction opposite to the motor 180. With the motor 180 rotating the member 184 in a counterclockwise direction as viewed from the top, for example, the shaft 198 will tend to rotate in the same direction. With the motor 200 rotating at the same speed as and in the opposite direction to the motor 180, however, the housing 218 remains stationary with respect to the supports. Consequently, the shaft 224, the spider 226, and the wheels 228 will remain stationary. By controlling the speed of the motor 200, the shaft 224 can rotate in the same direction as the lower member 184 or in the opposite direction, depending upon the speed of the motor 200.

Where a constant D.C. field is employed, as with the magnets, the motor 200 will operate at constant speed if current of a given frequency is applied to the armature. If the speed of the motor is to be varied, then current supplied to the armature can be from a power source having an output of variable frequency. On the other hand, power can be supplied to the field through additional slip rings and wipers to provide additional variation in the motor speed. Where the lower unit is to always remain stationary, the lower motor can be a servomotor electrically connected for synchronous operation with the main motor 180, with both motors driven through a single power source, but in opposite directions.

Various modifications of the above-described embodiments of the invention will be apparent to those skilled in the art, and such modifications can be made without departing from the scope of the invention if they are within the spirit and tenor of the accompanying claims.

We claim:

1. Apparatus for forming a strand into a spiral of closely-spaced loops, said apparatus comprising a support, a motor on said support, a shaft with a passage therethrough extending through said motor and rotatably driven thereby, said shaft having a connecting portion beyond said motor, means carried by said connecting portion and communicating with said shaft passage for directing strand outwardly from said shaft passage, a gear carried by said connecting portion, a supporting shaft attached to said connecting portion and coaxial with said motor shaft, conveying means driven by said gear for receiving said strand loops and moving them away from said motor, and a second motor carried by said supporting shaft and supporting said conveying means for restricting rotation of said conveying means relative to said connecting portion whereby said gear will move said conveying means in a manner to move said loops away from said motor.

2. Apparatus for forming a strand into a spiral of closely-spaced loops, said apparatus comprising a support, a motor on said support, a shaft with a passage therethrough extending through said motor and rotatably driven thereby, said shaft having a lower portion below said motor, means carried by said lower portion and communicating with said shaft passage for directing strand downwardly and outwardly from said shaft passage, a gear carried by said lower portion on a vertical axis coaxial with said shaft, a vertical supporting shaft connected with said lower portion and coaxial with said motor shaft, a plurality of sprockets, a second motor mounted on said vertical shaft and supporting said sprockets, said sprockets being engaged with said gear, a plurality of idlers, one for each of said sprockets, supported below said sprockets, conveying means connected between said sprockets and said idlers, and said second motor restricting rotation of said sprockets relative to said lower portion whereby said sprockets will engage said gear and rotate in a manner to move said conveying means downwardly.

3. Apparatus for forming a strand into a spiral of closely-spaced, horizontally-disposed loops, said apparatus comprising a support, a motor on said support, a shaft with a passage therethrough extending through said motor and rotatably driven thereby, said shaft having an enlarged lower portion below said motor, means carried by said enlarged portion and communicating with said shaft passage for directing strand downwardly and outwardly from said shaft passage, a central worm carried by said enlarged portion on a vertical axis coaxial with said shaft, a vertical supporting shaft connected with said enlarged portion and coaxial with said motor shaft, a second motor mounted on said supporting shaft and having a housing, an elongate member affixed to and depending from said housing, a spider connected with said elongate member, a plurality of radially-disposed sprocket means carried by said spider, said sprocket means being engaged with said worm, a second spider on said elongate member located below said first spider and having a plurality of idlers thereon, one for each of said sprocket means, conveyor belt means connected between said sprockets and said idlers, and said second motor restricting rotation of said spiders and said elongate member relative to said enlarged portion whereby said sprockets will engage said worm and rotate in a manner to move said conveyor belt means downwardly.

4. Apparatus for forming a strand into a spiral of closely-spaced, horizontally-disposed loops, said apparatus comprising a support, a vertical member rotatably held by said support, said member having guide means for a strand extending downwardly and outwardly from said member, said member carrying a guide adjacent the outlet end of said guide means, said member carrying a worm therebelow and rotatable therewith, a motor rotatably carried by said vertical member and located therebelow, means for receiving and holding the strand in the horizontally-disposed loops and for moving said loops downwardly, said means comprising a vertical support connected to said motor, vertically-disposed conveying means held by said support and meshing with said worm for receiving the strand from the guide means and for moving the strand downwardly, and said motor controlling rotation of said support on a vertical axis relative to said vertical member.

5. Apparatus for forming a strand into a spiral of closely-spaced, horizontally-disposed loops, said apparatus comprising a support, a hollow member rotatably held by said support, said member having guide means for a strand extending downwardly and outwardly from said member, said hollow member carrying a worm therebelow and rotatable therewith, a motor carried by said hollow member and located therebelow, means for receiving and holding the strand in the horizontally-disposed loops and for moving said loops downwardly, said means comprising a vertical support connected to said motor, a plurality of vertically and radially disposed sprockets mounted on said support for receiving said strand from said guide means, said sprockets meshing with said worm and rotating on their axes as said worm rotates with said hollow member relative to said sprockets, and said motor controlling rotation of said support and said sprockets relative to said hollow member.

6. Apparatus for forming a lineally-moving strand into a spiral of closely-spaced loops, said apparatus comprising a main support, a first motor supported by said main support, a member rotatably carried by said first motor, said member having loop-forming means, said member also having a shaft, a second motor mounted on said shaft and having a motor housing rotatable relative to said shaft, an elongate support connected to said housing, a plurality of means mounted on said elongate support for receiving in closely-spaced relationship the loops of the strand from said loop-forming means, and means for rotating said second motor at a controlled rate to determine the relative rotational movement between said member and said plurality of conveying means.

7. Apparatus for forming a lineally-moving strand into a spiral of closely-spaced loops, said apparatus comprising a main support, a first motor mounted on said support, a member having a shaft extending centrally through said motor and having a connecting portion beyond said motor including a depending shaft coaxial with said motor, said connecting portion having loop-forming means for forming the strand into a spiral of closely-spaced loops, a second motor mounted on said depending shaft, said second motor including a motor housing rotatable independently of said depending shaft, an elongate support affixed to said housing, a plurality of conveying means mounted on said elongate support for receiving and conveying the spiral of loops, means for driving said second motor at a controlled rate to cause relative rotatable movement between said loop-forming means and said conveying means, and means connecting said conveying means and said member for driving said conveying means to move the loops therealong away from said second motor.

8. Apparatus for forming a lineally-moving strand into a spiral of closely-spaced loops, said apparatus comprising a main support, a first motor mounted on said support, a member having a shaft extending centrally through said motor and having a connecting portion beyond said motor, said member having passage means for receiving said strand and for forming said strand into the spiral of closely-spaced loops when said member is rotated, said member having a second shaft coaxial with said motor, an armature mounted on said second shaft, a motor housing, means rotatably mounting said motor housing on said second shaft around said armature, means supported in said housing for establishing a field around said armature, conducting means extending through said member to the opposite side of said first motor for supplying power to operate said second motor, an elongate support affixed to said housing, a plurality of radially-disposed conveying means mounted on said elongate support, and means carried by said member and engageable with said conveying means for driving said conveying means and for moving the strand loops away from said second motor when said second motor is operated in a manner to provide relative rotation between said conveyor means and said member.

References Cited

UNITED STATES PATENTS

| | | | |
|---|---|---|---|
| 1,960,743 | 5/1934 | Junkers | 242—47.09 |
| 2,388,591 | 11/1945 | Andreas | 242—47.13 |
| 2,421,750 | 6/1947 | Gannett | 242—47.13 |
| 2,439,903 | 4/1948 | O'Connell | 242—47.13 |
| 2,936,877 | 5/1960 | Adams et al. | 242—47.09 |
| 3,131,729 | 5/1964 | Leysinger | 242—47.13 X |

FOREIGN PATENTS

| | | |
|---|---|---|
| 786,855 | 11/1957 | Great Britain. |

STANLEY N. GILREATH, Primary Examiner

U.S. Cl. X.R.

28—21